United States Patent
Tajabadi

(10) Patent No.: US 9,694,792 B2
(45) Date of Patent: Jul. 4, 2017

(54) BACKSTOPPING BREAK SYSTEM (BBS) FOR MANUAL TRANSMISSION AUTOMOBILES

(71) Applicant: Morteza Soltani Tajabadi, Kerman (IR)

(72) Inventor: Morteza Soltani Tajabadi, Kerman (IR)

( * ) Notice: Subject to any disclaimer, the term of this patent is extended or adjusted under 35 U.S.C. 154(b) by 110 days.

(21) Appl. No.: 14/485,785

(22) Filed: Sep. 14, 2014

(65) Prior Publication Data

US 2016/0075314 A1    Mar. 17, 2016

(51) Int. Cl.
| | |
|---|---|
| *B60T 1/00* | (2006.01) |
| *B60T 7/12* | (2006.01) |
| *F16D 41/12* | (2006.01) |
| *F16D 41/14* | (2006.01) |
| *F16D 48/06* | (2006.01) |

(52) U.S. Cl.
CPC ............... *B60T 7/122* (2013.01); *B60T 1/005* (2013.01); *F16D 41/12* (2013.01); *F16D 41/14* (2013.01); *F16D 48/06* (2013.01); *B60T 2201/06* (2013.01); *F16D 2500/10493* (2013.01); *F16D 2500/50841* (2013.01)

(58) Field of Classification Search
CPC .......... B60T 1/005; B60T 1/062; F16D 41/12; F16D 2500/50841; F16H 63/3425; F16H 63/3433
See application file for complete search history.

(56) References Cited

U.S. PATENT DOCUMENTS

| | | | | |
|---|---|---|---|---|
| 4,934,490 | A * | 6/1990 | Chang ..................... | B60T 1/005 188/218 XL |
| 6,748,311 | B1 * | 6/2004 | Walenty ................ | B60W 10/02 701/70 |
| 8,616,093 | B1 * | 12/2013 | Maniak ............... | E05D 13/1261 160/192 |
| 2012/0000743 | A1 * | 1/2012 | Wittkopp ................ | B60T 7/122 192/219.1 |

FOREIGN PATENT DOCUMENTS

| | | | | |
|---|---|---|---|---|
| DE | EP 1002684 | A2 * | 5/2000 | ............. B60T 1/005 |
| IT | EP 0518008 | A1 * | 12/1992 | ............. B60T 1/005 |

OTHER PUBLICATIONS

English-language abstract of EP 0518008 (no date).*
English-language abstract of EP 1002684 (no date).*

* cited by examiner

*Primary Examiner* — Nicholas J Lane
(74) *Attorney, Agent, or Firm* — Azadeh Saidi

(57) ABSTRACT

Backstopping Brake System (BBS) is a part with two original and Accessory natures that can be installed on all manual transmission cars which their engine power is transmitted into forward wheels. By installing the system on vehicle forward wheels axle (plus (P)), when plus rotates around its axle in a reverse motion of engine, it locks the plus (P) and prevents unnecessary reverse motion of vehicle. This system can be activated or inactivated from cabin inside wirelessly through control remote system (2-3) or by wire. In the case of necessary reverse motion, this system is inactivated by pulling back its pawl. For safety, when vehicle has a severe shock, this system will be separated from joint point of vehicle body.

2 Claims, 5 Drawing Sheets

BACKSTOPPING BREAK SYSTEM (BBS) FOR MANUAL TRANSMISSION AUTOMOBILES

SUMMARY OF INVENTION

This invention is a solution for improvement driving enjoyment and safety for low skilled drivers in places that have three following characteristics:
1) Multiplicity of steep vehicle passages
2) Heavy traffic in vehicle passages
3) Safety distance nonconformity by drivers This system can be used on vehicles that are equipped with manual transmission gearbox and it is installed on forward wheels axle as a side part (accessory) instead of lying in gearbox mechanism.

This invention has been designed to improve driving enjoyment and safety for low skilled drivers that have to drive in steep and heavy traffic vehicle passages that safety distance is not conformed by back vehicle. Low skill drivers have difficulties in every stop by having concern about probable reverse motion of vehicle face up to a problem in controlling their vehicles and are always worried during the path. This system after activation prevents unwanted rollback of vehicle. So the driver by having confidence about this matter passes the acclivity simply.

This system not only can be installed on vehicles in factory originally but also it can be installed as a vehicle side part (accessory) that has no interference in any systems of vehicle and there is no need to open any part. For safety, when vehicle has a severe shock, if this system makes disorder in vehicle forward motion, it will be separated from joint point of vehicle body and rotates accompanied with plus to keep vehicle safe.

This system has been designed as a clamp which is located around plus and for installation there is no need to remove any part of the car. Also it has been designed in a way that is installed very quickly (based on vehicle type maximum 10 minutes). Meanwhile, it can be installed on all vehicles equipped with manual gearbox which their motor power is exerted to forward wheels.

According to weight of the vehicle (V), the material selection depends on loads and stresses produced by the resistance force against the weight of the vehicle. So it is obviously that material selection includes large variety ferrous alloys to Plastic and etc.

DETAILED DESCRIPTION

This invention is consisted of two main sections; that will be explained later:
Ratchet System (1)
Control system (2)

Ratchet System (1)

Figure 1:
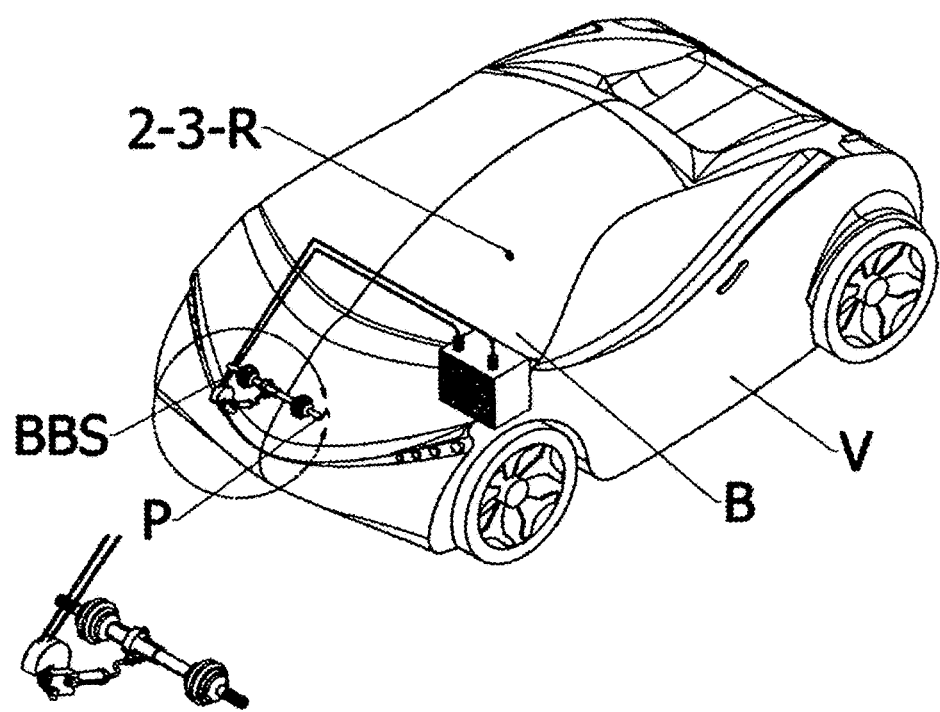
FIG. 1 shows the location of BBS, battery and remote control in vehicle accompanied with their numbers.
Figure 2:
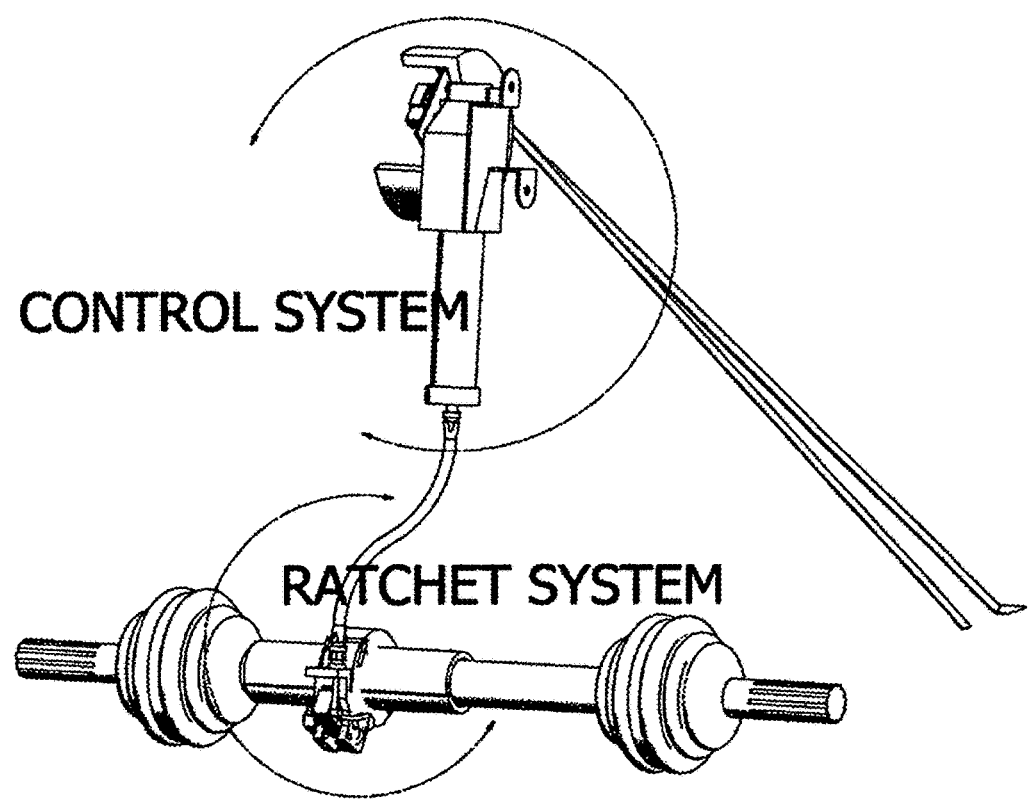
FIG. 2 shows two main sections of BBS including ratchet system and control system accompanied with their numbers.
Figure 3:
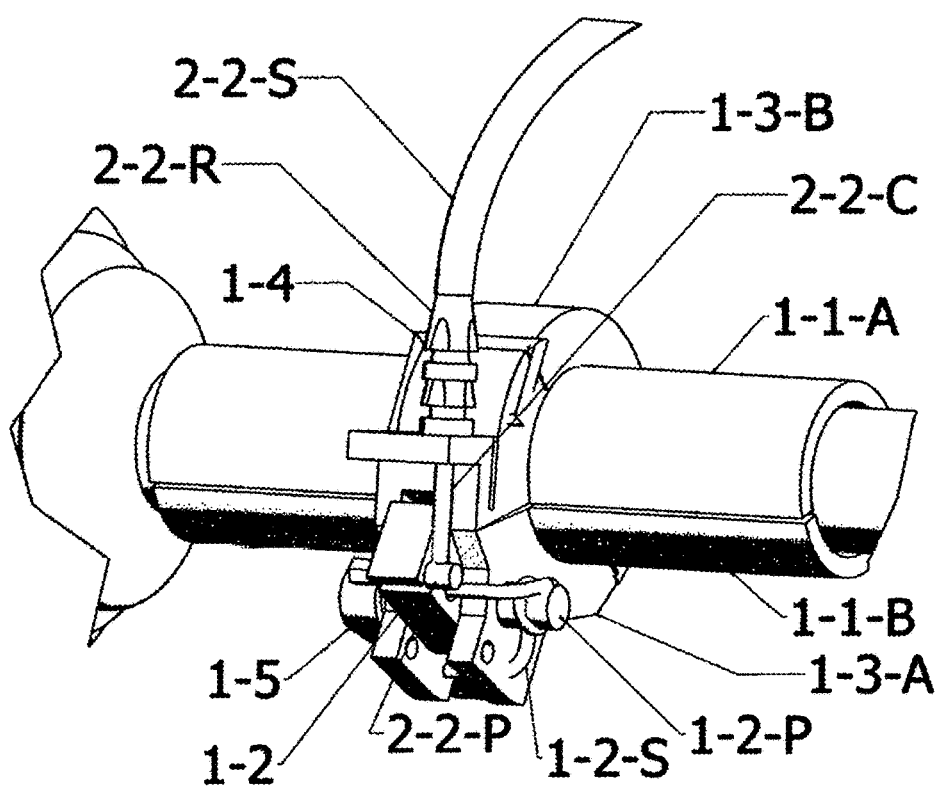
FIG. 3 shows different parts of ratchet system accompanied with their numbers.
Figure 4:
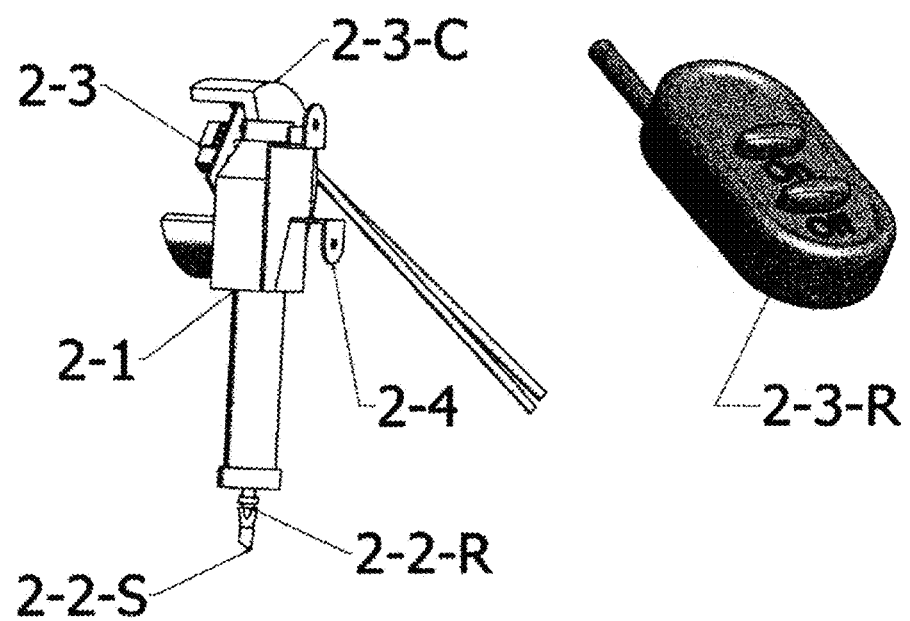
FIG. 4 shows different parts of control system accompanied with their numbers.
Figure 5:
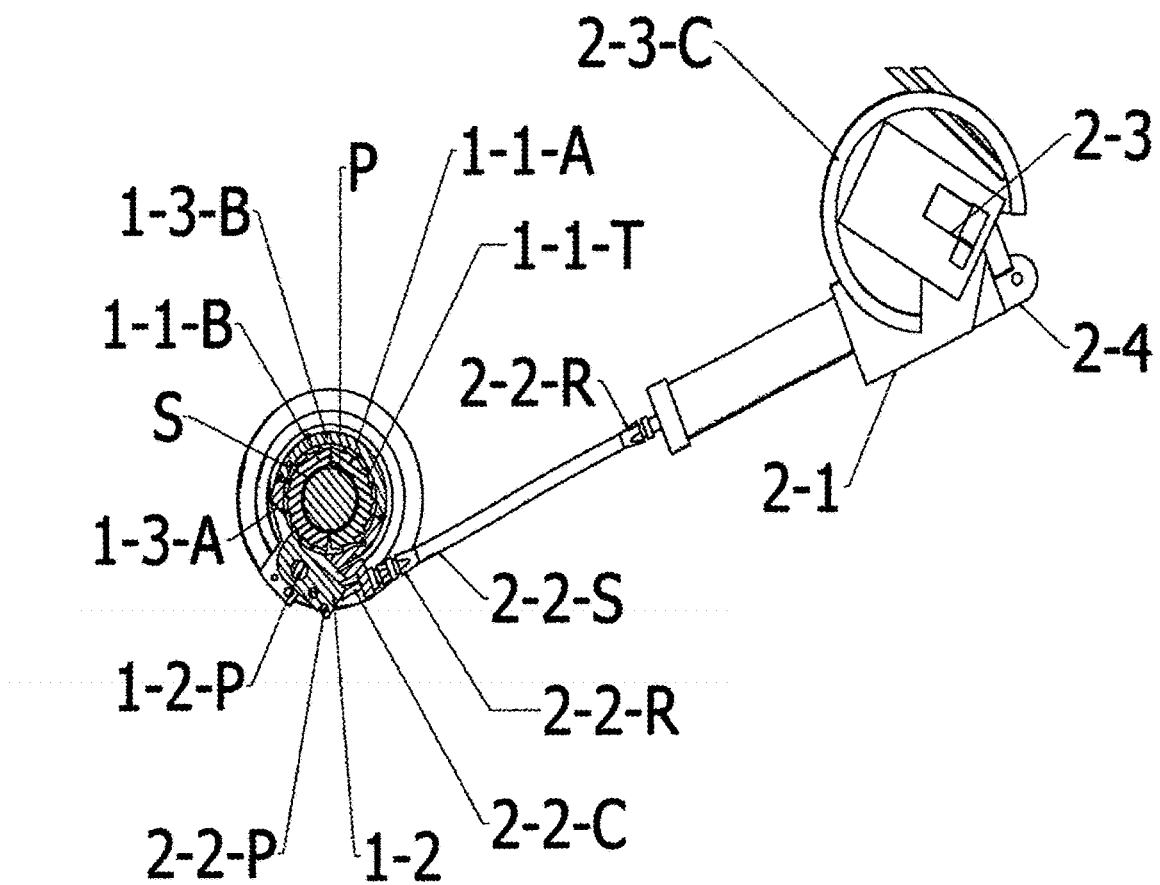
FIG. 5 shows all components of BBS including ratchet system and control system installed on plus axle accompanied with their numbers.

This system is a ratchet that is comprised of wheel (1-1) and pawl (1-2). Wheel (1-1) is located on vehicle plus (P) and it is fixed by sticking (S) via some kind of adhesive or is welded thereto. Sticking point has been specified in FIG. 5. When BBS is manufactured as an original part by automaker, wheel (1-1) can be located on plus (P) axle as a piece in manufacturing phase.

Wheel (1-1)

Wheel (1-1) includes two semicircle clamps, (1-1-A) and (1-1-B) that are located as clamps on plus (P) axle and are fixed by special sticking.

Pawl (1-2)

When wheel (1-1) moves inversely (Counter Clockwise), pawl (1-2) gets stuck in wheel cogs (1-1-T) and causes a brake and therefore prevents backward motion of plus (P). In forward motion (Clockwise), wheel (1-1) will distance wheel cogs (1-1-T) from pawl spontaneously. The power that pushes pawl (1-2) on wheel cogs (1-1-T) can be either from pawl spring (1-2-S) or pawl's (1-2) gravitational power. Pawl (1-2) rotates around pawl pin (1-2-P) that has been fixed on case (1-3).

Pawl's (1-2) rollback, causes BBS inactivation. This action happens through Electro-Mechanical Actuator (2-1).

Case (1-3)

Case (1-3) consists of two semicircles, (1-3-A) that pawl (1-2) and control cable (2-2) are joined to it and it is also connected to (1-3-B) which is a simple semi-cylinder and is connected to (1-3-A) on the other end, and therefore covers the entire wheel (1-1). For exact and quick coupling of two semicircles of case (1-3), two quick clamping springs (1-3-S) are located on contact border of two semicircles that cause quick and instant clamp of two semicircles.

Clamping Joint (1-4)

This joint is a device for clamping two parts of case (1-3). It couples to them and therefore fixes them in place. This can be done either via a spring attachment or screw. Clamping joint (1-4) design is in a way that clamping is too simple and instant for installation. We can use a spring instead of screw to join two parts of case (1-3). In this way installation speed is lower but installation stability is higher.

Holder (1-5)

This part fixes pawl pin (1-2-P) to a rigid point of vehicle structure and stands resistant power against rollback (Rigid point means a place with high value of structural strength which is able to withstand vehicle weight on the slopes). Based on vehicle type, the size and form of this part is different and is in the form of chain or buckle. Also based on vehicle type, joint forms and joint points are different.

Control System (2)

This system undertakes the task of inactivating ratchet system (1) to provide vehicle backward motion (counter clockwise rotation of the vehicle) possibility in necessary situations as reverse motion. Control system has been consisted of following sections:

Electro-Mechanical Actuator (2-1)

This motor provides necessary power to pull back pawl (1-2). Its energy is supplied through Battery (B).

Control Cable (2-2)

This sheathed steel cable (like cars clutch cable) transmits electro-mechanical actuator (2-1) power to pawl (1-2). Using cable mechanism provides the possibility to install actuator (2-1) in various layouts for different vehicle structures without any limitation. This cable is consisted of three sections, sheath (2-2-S), wire (2-2-C) and regulation screws (2-2-R). Sheath (2-2-S) is fixed to the vehicle body. Therefore when vehicle moves forward, friction force between case (1-3) and plus (P) pulls case (1-3) in plus (P) rotation direction. Since cable (2-2) has been fixed to cars main structure, it resists against this motion and is pulled. It causes steel cable/wire (2-2-C) inside sheath (2-2-S) to be pulled back and subsequently causes pawl (1-2) to draw back. As a result, when vehicle moves forward, pawl (1-2) doesn't play/engage on wheel cogs (1-1-T) and it prevents making noise.

To optimize control cable (2-2) function, regulation screws (2-2-R) are located on its two tips, so cable is always pulled with an appropriate value and electro-mechanical actuator (2-1) can control pawl (1-2) motion precisely. Control cable is joined to pawl (1-2) through pin (2-2-P).

Remote Control Kit (2-3)

This kit is controlled through remote control (2-3-R); which controls electro-mechanical motor function (2-1). It provides activation and inactivation possibility of BBS by driver from cabin. This kit is protected inside the remote control kit case (2-3-C).

Control System Stand (2-4)

Stand (2-4) fixes control system (2) on vehicle body in an appropriate place.

This embodiment was simply the best mode of operation of the current invention, it is however obvious to one having ordinary skill in the art that other configurations within the scope of the invention can be utilized to achieve best performance for the invention.

The invention claimed is:

1. A backstopping brake for manual transmission vehicles system comprising a manual transmission gearbox, a ratchet comprising of at least a wheel and a pawl; wherein said wheel comprises a first and second semicircular clamps located on a plus axle and attached to said plus axle via an attachment means; when said wheel rotates counter clockwise (CCW) said pawl gets stuck in cogs of said wheel and causes a brake and therefore prevents backward motion of said plus; on the other hand when said wheel is rotating forward/clockwise causes said cogs from engaging with said pawl; a control system inactivates said ratchet providing backward motion of said vehicle; said system further comprising a control cable, comprising two regulation screws transferring a power of an electro-mechanical actuator to said pawl; a case comprising of two semicircles covering and clamping said first and second semicircular clamps of said wheel respectively, therefore fixedly attached to said plus axle, wherein one of said semicircles of said case is attached to said pawl and said control cable; therefore when said plus moves forward, said case is pulled in a direction similar to that of said plus; said control cable comprises a sheath covering a wire; wherein said sheath is fixedly attached to a body of said vehicle and therefore when said vehicle moves a friction force between said case and said plus pulls said case in said plus rotation direction, causing said wire to be pulled back and subsequently pulling back said pawl without any power of said electro-mechanical actuator, therefore preventing any collision/contact between said pawl with said wheel cogs.

2. The backstopping brake system of claim 1, wherein said attachment means comprises sticking via an adhesive compound or welding.

* * * * *